(12) United States Patent
Spryshak

(10) Patent No.: US 8,945,285 B2
(45) Date of Patent: *Feb. 3, 2015

(54) WATER SEPARATOR HAVING A GUTTER

(75) Inventor: Joseph Spryshak, Hartland, MI (US)

(73) Assignee: Valeo Climate Control, Auburn Hills, MI (US)

(*) Notice: Subject to any disclaimer, the term of this patent is extended or adjusted under 35 U.S.C. 154(b) by 429 days.

This patent is subject to a terminal disclaimer.

(21) Appl. No.: 13/336,612

(22) Filed: Dec. 23, 2011

(65) Prior Publication Data

US 2013/0160649 A1 Jun. 27, 2013

(51) Int. Cl.
*B01D 45/00* (2006.01)

(52) U.S. Cl.
USPC ........... 95/272; 95/268; 55/385.3; 55/413; 55/439; 55/462; 55/410; 55/464; 55/421; 55/423; 55/492; 55/479; 55/491; 55/392; 55/394; 55/428; 96/220

(58) Field of Classification Search
CPC .... B01D 45/08; B01D 46/2411; B01D 45/12; B01D 46/0005; B01D 46/10
USPC ........ 55/385.3, 413, 439, 462, 410, 464, 421, 55/423, 492, 479, 481, 392, 394, 428; 96/220; 95/268, 272
See application file for complete search history.

(56) References Cited

U.S. PATENT DOCUMENTS

| 2,894,599 | A | * | 7/1959 | Leininger | 55/325 |
| 3,721,069 | A | * | 3/1973 | Walker | 55/319 |
| 4,087,263 | A | * | 5/1978 | Schonmann, Jr. | 55/320 |
| 5,088,280 | A | * | 2/1992 | Scott-Scott et al. | 60/257 |
| 5,989,302 | A | * | 11/1999 | Krowech | 55/424 |
| 6,055,701 | A | * | 5/2000 | Grey et al. | 15/327.7 |
| 7,197,885 | B2 | | 4/2007 | Kozak et al. | |
| 2011/0167774 | A1 | * | 7/2011 | Herman et al. | 55/423 |
| 2012/0297980 | A1 | * | 11/2012 | Slaughter et al. | 95/272 |

* cited by examiner

*Primary Examiner* — Dung H Bui
(74) *Attorney, Agent, or Firm* — Howard & Howard Attorneys PLLC

(57) ABSTRACT

A water separator reduces a water content of an air stream, which is used in an HVAC unit for a vehicle. The water separator includes a diverter wall and an adjacent wall spaced from the diverter wall to define an air passage. The diverter wall has a terminal end extending into the air passage for changing a direction of the air stream flowing through the air passage to separate water droplets from the air stream to reduce the water content of the air stream. A gutter is coupled to the terminal end of the diverter wall and extends into the air passage. The gutter defines a drainage channel configured to receive the water droplets that form on the diverter wall for preventing the water droplets from reentering the air stream flowing through the air stream passage.

14 Claims, 6 Drawing Sheets

WATER SEPARATOR HAVING A GUTTER

BACKGROUND OF THE INVENTION

1. Field of the Invention

The invention generally relates to a water separator. More specifically, the invention relates to a water separator having a gutter.

2. Description of the Related Art

The use of a Heating, Ventilating, and/or Air-conditioning (HVAC) unit in vehicles is known in the art. It is desirable to reduce a water content of an air stream used in the HVAC unit to prevent moisture from being introduced into a passenger compartment of the vehicle. Moisture causes failures of electrical components and can cause odors, which enter the passenger compartment of the vehicle. Moreover, it is desirable to reduce the water content of the air stream used in the HVAC unit to avoid any risk of moisture forming mist or fog on windows in the passenger compartment of the vehicle. As such, the HVAC unit includes a conventional water separator for reducing the water content of the air stream used in the HVAC unit. Generally, the conventional water separator changes a direction of the air stream flowing through the water separator to force water droplets from the air stream thereby reducing the water content of the air stream.

The conventional water separator has a housing, which includes a diverter wall and an adjacent wall spaced from the diverter wall. The diverter wall and the adjacent wall define an air passage for allowing the air stream to flow through the water separator. The diverter wall has a terminal end. The terminal end of the diverter wall forces the air stream to rapidly change direction to force the water droplets from the air stream. Generally, the water droplets form on the diverter wall and the adjacent wall. The water droplets on the diverter wall flow along the diverter wall under gravitational forces toward the terminal end of the diverter wall. Because the air passage wraps around the terminal end of the diverter wall, the water droplets that form on the diverter wall drip from the terminal end into the air passage and reenter the air stream. These water droplets that drip into the air stream are entrained in the air stream and travel with the air stream that is used in the HVAC unit. As such, the effectiveness of the water separator to eliminate moisture in the form of the water droplets from the air stream is diminished. Therefore, the water droplets that reenter the air stream result in moisture entering the passenger compartment of the vehicle. It is undesirable to for the HVAC unit to introduce moisture into the passenger compartment of the vehicle.

An alternative water separator has ribs along a diverter wall to direct water droplets that form on the diverter wall away from a terminal end of the diverter wall to prevent the water droplets from reentering the air stream. However, demand in the industry to produce smaller HVAC units and smaller water separators has resulting in an increase in a velocity of the air stream flowing through the smaller water separators. The increased velocity renders the use of ribs on diverter walls ineffective for preventing water droplets from reentering the air stream. Therefore, there remains a need to provide an improved water separator.

SUMMARY OF THE INVENTION AND ADVANTAGES

A water separator reduces a water content of an air stream, which is used in a Heating, Ventilating, and/or Air-conditioning (HVAC) unit for a vehicle. The water separator includes a housing defining an air intake for introducing the air stream into the water separator. The housing has a diverter wall and an adjacent wall spaced from the diverter wall. The diverter wall and the adjacent wall define an air passage within the housing that is in communication with the air intake for allowing the air stream to flow through the housing. The diverter wall has a terminal end extending into the air passage for changing a direction of the air stream flowing through the air passage. Changing the direction of the air stream flowing through the air passage separates water droplets from the air stream such that the water droplets form on at least the diverter wall to reduce the water content of the air stream.

An air outlet is defined by the housing and is in communication with the air passage downstream from the terminal end of the diverter wall for discharging the air stream that has the reduced water content from the air passage. The air stream discharged from the air passage is use in the HVAC unit.

A gutter is coupled to the terminal end of the diverter wall and extends into the air passage. The gutter defines a drainage channel configured to receive the water droplets that form on the diverter wall for preventing the water droplets from reentering the air stream flowing through the air stream passage. Preventing the water droplets from reentering the air stream maximizes the reduction of the water content of the air stream that is discharged from the air passage at the air outlet. Maximizing the reduction of the water content of the air stream reduces the moisture that is introduced into a passenger compartment of the vehicle.

BRIEF DESCRIPTION OF THE DRAWINGS

Other advantages of the present invention will be readily appreciated, as the same becomes better understood by reference to the following detailed description, when considered in connection with the accompanying drawings wherein.

DETAILED DESCRIPTION OF THE EXEMPLARY EMBODIMENT

Figure 1:
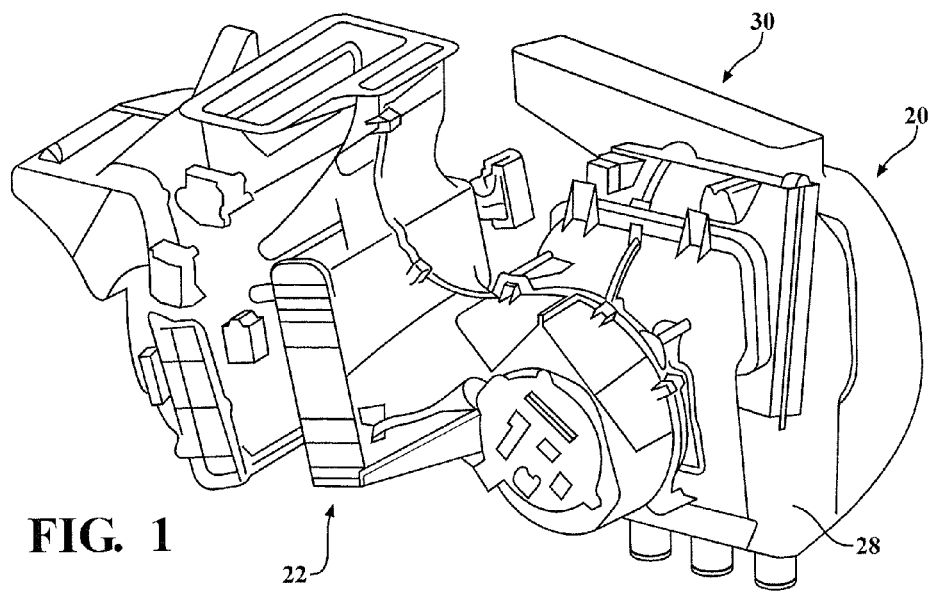
FIG. 1 is a perspective view of a water separator and an HVAC unit.

Referring to the Figures, wherein like numerals indicate corresponding parts throughout the several views, a water separator is generally shown at 20. With reference to FIG. 1, generally, the water separator 20 is part of a Heating, Ventilating, and/or Air-conditioning (HVAC) unit 22 for a vehicle. It is to be appreciated that the water separator 20 may be considered a part of the HVAC unit 22 or a separate component relative to the HVAC unit 22. When the water separator 20 is a separate component relative to the HVAC unit 22, the water separator 20 is typically directly coupled to the HVAC unit 22. However, it is to be appreciated that the water separator 20 is in communication with the HVAC unit 22 even if the water separator 20 is not directly coupled to the HVAC unit 22. It is also to be appreciated that the water separator 20 can be used in other application besides the HVAC unit 22.

Generally, ambient air surrounding the water separator 20 has moisture entrained within it. It is undesirable to use the ambient air in the HVAC unit 22 because such use will result in the introduction of moisture within a passenger compartment of the vehicle. Generally, the introduction of moisture within the passenger compartment of the vehicle causes failure of electrical components and can cause odors, which enter the passenger compartment of the vehicle. Additionally, the introduction of moisture within the passenger compartment of the vehicle result in moisture forming mist or fog on windows in the passenger compartment. Therefore, the water separator 20 treats the ambient air before the ambient air can be used in the HVAC unit 22. More specifically, an air stream 24 comprising the ambient air is introduced into the water separator 20. The air stream 24 that is introduced into the water separator 20 may have a water content, which is related to the moisture entrained within the ambient air. Said differently, because the ambient air may have moisture entrained within it and the ambient air is used to produce the air stream 24, the air stream 24 has the first water content. It is to be appreciated that the term water content as used herein may encompass any form of liquids or vapor that are entrained in the ambient air or the air stream 24 and does not refer only to water entrained within the ambient air or the air stream 24.

Figure 2:
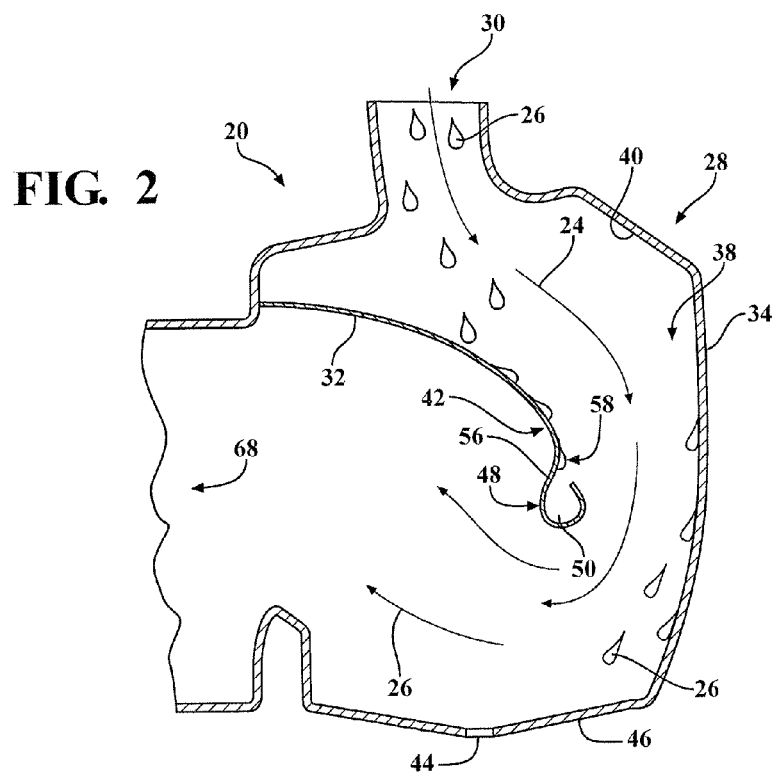
FIG. 2 is a partial cross-sectional view of the water separator showing a diverter wall and a gutter coupled to the diverter wall.

As best shown in FIG. 2, the air stream 24 flows through the water separator 20 to reduce the water content of the air stream 24. More specifically, the air stream 24 introduced into the water separator 20 has a first water content and the air stream 24 discharged from the water separator 20 has a second water content. Typically, the second water content of the air stream 24 discharged from the water separator 20 is lower than the first water content. More typically, the air stream 24 discharged from the water separator 20 is dry, such that the sir stream 24 discharged from the water separator 20 contains no water. Said differently, more typically, the second water content of the air stream 24 discharged from the water separator 20 is zero. Generally, the water separator 20 is capable of separating water droplets 26 or other liquids or vapors from the air stream 24 to reduce the water content of the air stream 24. Therefore, the air stream 24 can be used in the HVAC unit 22, and, more specifically, an air conditioning system of the vehicle.

Figure 3:
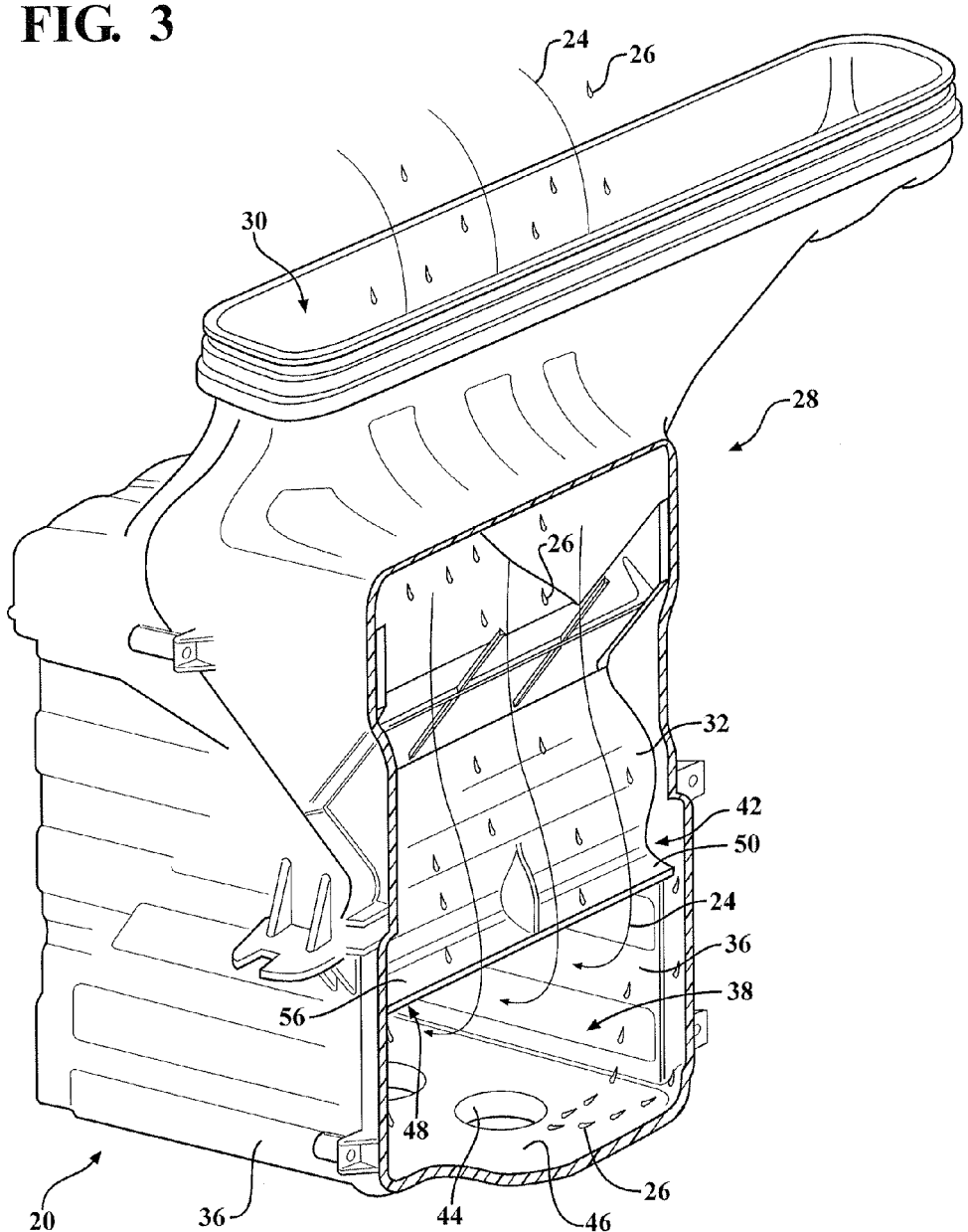
FIG. 3 is a perspective view of a portion of the water separator with an adjacent wall removed to show the diverter wall.

With reference to FIGS. 2 and 3, the water separator 20 includes a housing 28. The housing 28 defines an air intake 30 for introducing the air stream 24 into the water separator 20. More specifically, the air intake 30 provides an opening to allow the ambient air to enter the water separator 20 in the form of the air stream 24. When the water separator 20 is coupled to the vehicle, the air intake 30 is exposed to the ambient air for receiving the ambient air. It is to be appreciated that the ambient air can be introduced into the air intake 30 by any suitable methods, such as by suction or by forced air. The ambient air can either be fresh air coming from outside the vehicle or recycled air coming from the passenger compartment of the vehicle. Furthermore, the ambient air can also be a mixture of fresh air and recycled air.

The housing 28 has a diverter wall 32 and an adjacent wall 34 spaced from the diverter wall 32. The housing 28 also has at least two sidewalls 36 with each of the sidewalls 36 interconnecting the diverter wall 32 and the adjacent wall 34. Generally, the diverter wall 32, the adjacent wall 34, and the sidewalls 36 are integral with each other. Said differently, the housing 28 may be made of assembled components such that the diverter wall 32, the adjacent wall 34, and the sidewalls 36 cannot be separated from each other without compromising the quality of the components. The housing 28 can be made from any suitable material, such as metal, plastic, and combinations thereof. Typically, the housing 28 is made from a thermoplastic material, such as polypropylene (PP) or acrylonitrile butadiene styrene (ABS). However, the housing 28 and, more specifically, the diverter wall 32, the adjacent wall 34, and the side walls are formed from a thermoplastic.

The diverter wall 32 and the adjacent wall 34 define an air passage 38 within the housing 28. More specifically, the diverter wall 32, the adjacent wall 34, and the sidewalls 36 define the air passage 38. The air passage 38 is in communication with the air intake 30 for allowing the air stream 24 to flow through the housing 28. Said differently, the housing 28 has a hollow interior 40, which is the air passage 38 and is defined by the diverter wall 32, the adjacent wall 34, and the sidewalls 36.

The diverter wall 32 has a terminal end 42 extending into the air passage 38 for changing a direction of the air stream 24 flowing through the air passage 38. Said differently, the air passage 38 has a U-shaped configuration at the terminal end 42. The air passage wraps around the terminal end 42 of the diverter wall 32 to change the direction of the air stream 24 flowing through the air passage 38. Said yet another way, the terminal end 42 of the diverter wall 32 turns the air stream 24 around the diverter wall 32 such that the air stream 24 is forced downward and then the air stream 24 is force upward as the air stream 24 flows around the terminal end 42 of the diverter wall 32. Changing the direction of the air stream 24 flowing through the air passage 38 separates water droplets 26 from the air stream 24 to reduce the water content of the air stream 24. Generally, the changing of the direction of the air stream 24 occurs rapidly for forcing the water droplets 26 from the air stream 24. The separation of the water droplets 26 from the air stream 24 lowers the water content of the air stream 24 from the first water content to the second water content.

The water droplets 26 that are separated from the air stream 24 form on the walls of the housing 28, such as the diverter wall 32 and/or the adjacent wall 34. Typically, the water droplets 26 flow by gravity along the housing 28 and exit the water separator 20 through a drain hole 44 defined by the housing 28. A base 46 of the housing interconnects the diverter wall 32, the adjacent wall 34, and the sidewalls 36 of the housing 28 and defines the drain hole 44. Generally, the water droplets 26 that form on the adjacent wall 34 and the sidewalls 36 flow by gravity along the walls to the base 46 of the housing 28. The base 46 of the housing 28 is sloped toward the drain hole 44 such that the water droplets 26 that reach the base 46 of the housing 28 flow along the base 46 to the drain hole 44 to exit the water separator 20. Therefore, the water droplets 26 that form on the adjacent wall 34 and the sidewalls 36 are provided with a drainage path that does not cross the air stream 24. Said differently, the drainage path of the water droplets 26 that form on the adjacent wall 34 and the sidewalls 36 does not intersect the air stream 24. As such, the water droplets 26 that form on the adjacent wall 34 and the sidewalls 36 are prevented from reentering the air stream 24.

The water separator 20 may also includes a gutter 48 coupled to the terminal end 42 of the diverter wall 32 in the air passage 38. The gutter 48 removes the water droplets 26 from the diverter wall 32 to prevent the water droplets 26 from reentering the air stream 24 while minimizing turbulence and pressure drops of the air stream 24 flowing through the air passage 38. The gutter 48 defines a portion the air passage 38 such that the air stream 24 flowing through the air passage 38 must flow around the gutter 48. Said differently, the gutter 48 is an extension of the terminal end 42 of the diverter wall 32. As such, the gutter 48 may be integral to the terminal end 42 of the diverter wall 32 and is therefore integral with the diverter wall 32 itself. Alternatively, the gutter 48 may be a separate component relative to the diverter wall 32.

Generally, the gutter 48 directs the water droplets 26 that collect or form on the diverter wall 32 toward the sidewalls 36. More specifically, the gutter 48 defines a drainage channel 50 configured to receive the water droplets 26 that form on the diverter wall 32. The drainage channel 50 may be in communication with the drain hole 44 in the base 46 of the housing 28 via the sidewalls 36. The gutter 48 allows the water separator 20 to reduce the water content of the air stream 24 flowing through the water separator 20 while preventing the re-entrainment of the water droplets 26 that form within the housing 28 of the water separator 20. Typically, the water droplets 26 collected within the drainage channel 50 are directed toward the sidewalls 36 of the housing 28 to prevent the water droplets 26 that form on the diverter wall 32 from reentering the air stream 24 flowing through the air stream 24 passage. Said differently, the gutter 48 directs the water droplets 26 that form on the diverter wall 32 away from the air stream 24 flowing through the air passage 38.

The drainage channel 50 of the gutter 48 has a slope for allowing the water droplets 26 collected by the drainage channel 50 to flow toward the sidewalls 36 within the drainage channel 50 with the aid of gravity. Directing the water droplets 26 that form on the diverter wall 32 away from the air stream 24 prevents the water droplets 26 from reentering the air stream 24 thereby improving the effectiveness of the water separator 20. Said differently, the interaction of the air stream 24 and the sidewalls 36 of the housing 28 limit an amount of undesirable re-entrainment of the water droplets 26 that form within the housing 28. Therefore, directing the water droplets 26 toward the sidewalls 36 limits the amount of undesirable entrainment that occurs as a result of the reentry of the water droplets 26 into the air stream 24.

Figure 4:
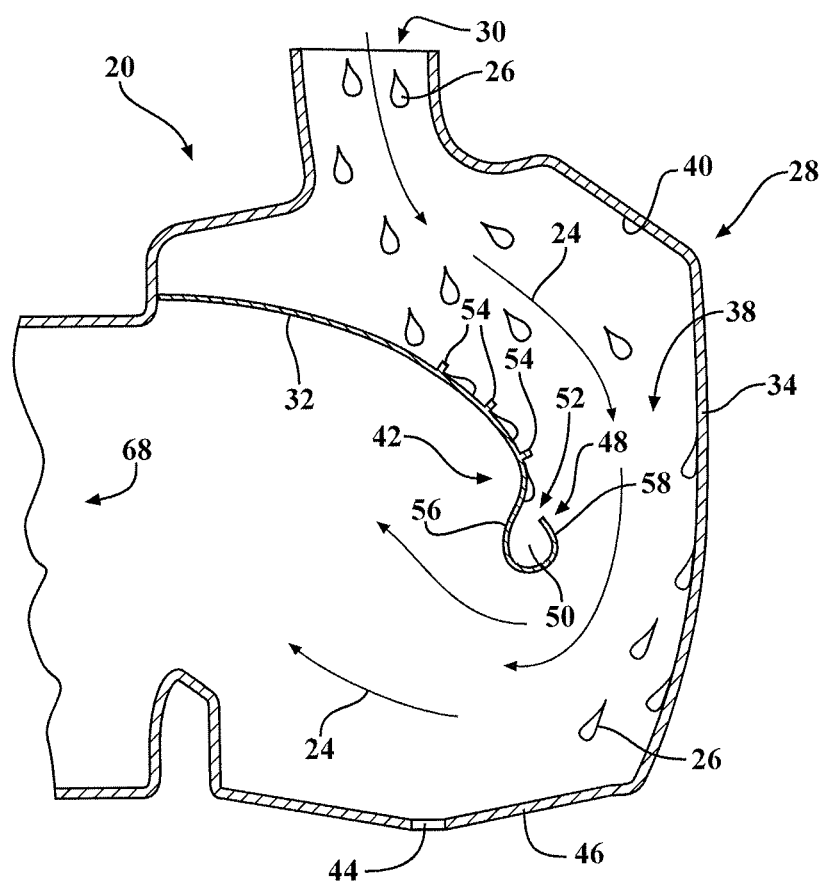
FIG. 4 is another partial cross-sectional view of the water separator showing the diverter wall having ribs.
Figure 5:
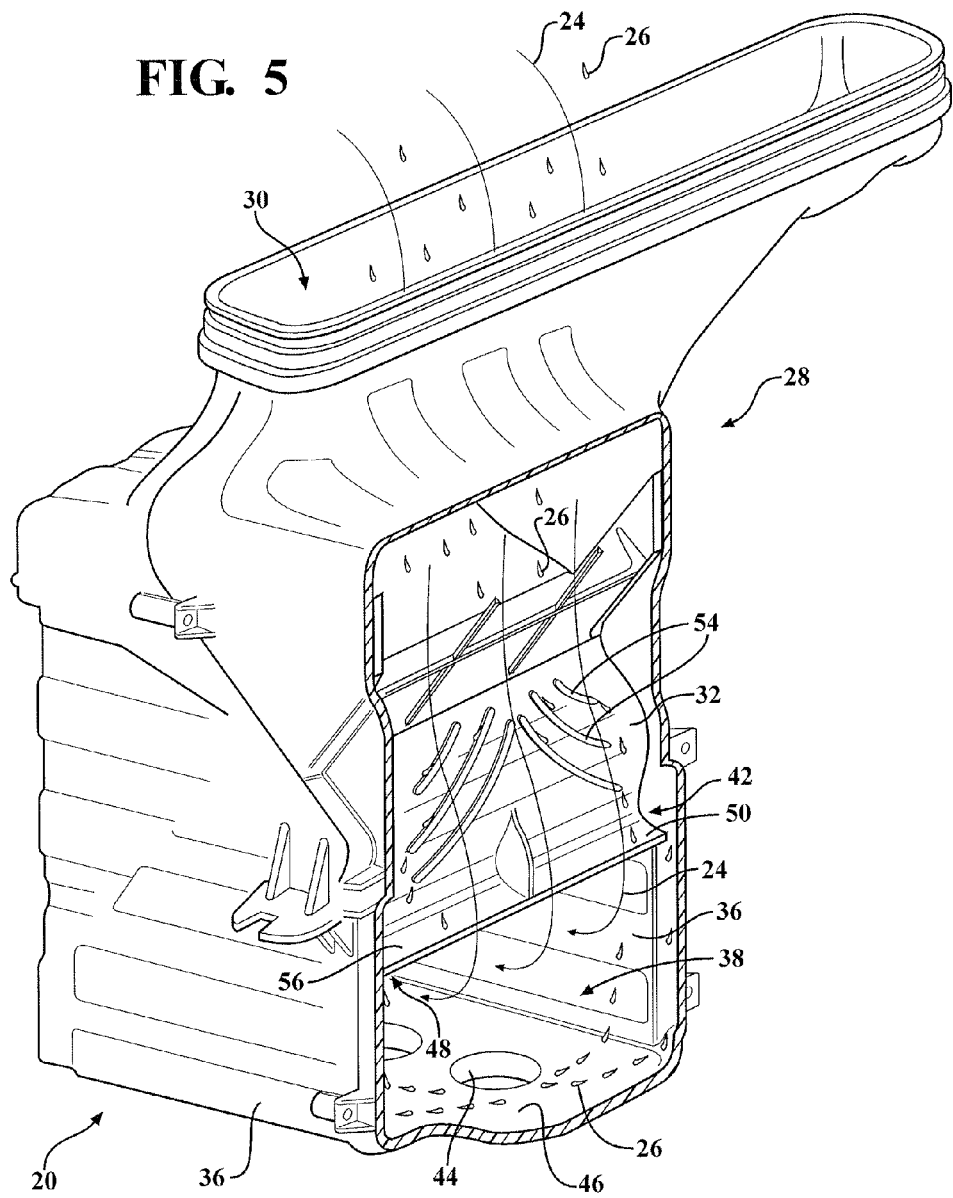
FIG. 5 is another perspective view of a portion of the water separator with the adjacent wall removed to show the ribs on the diverter wall.

Generally, the gutter 48 defines a slot 52 adjacent the terminal end 42 of the diverter wall 32. The slot 52 may span a length of the gutter 48 for allowing the water droplets 26 to enter the drainage channel 50. Said differently, the slot 52 may extend between the sidewalls 36 of the housing 28. Alternatively, the slot 52 may only extend for a portion of the length of the gutter 48. With reference to FIGS. 4 and 5, at least one rib 54 may be disposed on the diverter wall 32 adjacent the terminal end 42 for directing the water droplets 26 that form on the diverter wall 32 into the gutter 48. The rib 54 is described in further detail below.

The gutter 48 may have a proximal portion 56 coupled to the terminal end 42 of the diverter wall 32. The gutter also may include a terminal finger 58 extending from the proximal portion 56. The proximal portion 56 and the terminal finger 58 define the drainage channel 50 of the gutter 48. The slot 52 is defined between the terminal finger 58 and the proximal portion 56. The proximal portion 56 and the terminal finger 58 may present a J-shaped cross-sectional configuration of the gutter 48. When the gutter 48 has the J-shaped cross-sectional configuration, the terminal finger 58 turns back upon itself to provide a hook shape. The hook shape of the terminal finger 58 limits the disruption of the air stream 24 flowing around the gutter 48 within the air passage 38 thereby minimizing turbulence and pressure drops experienced by the air stream 24. It is to be appreciated that the gutter 48 may have other cross-sectional configurations, such as C-shaped and V-shaped.

Figure 6:
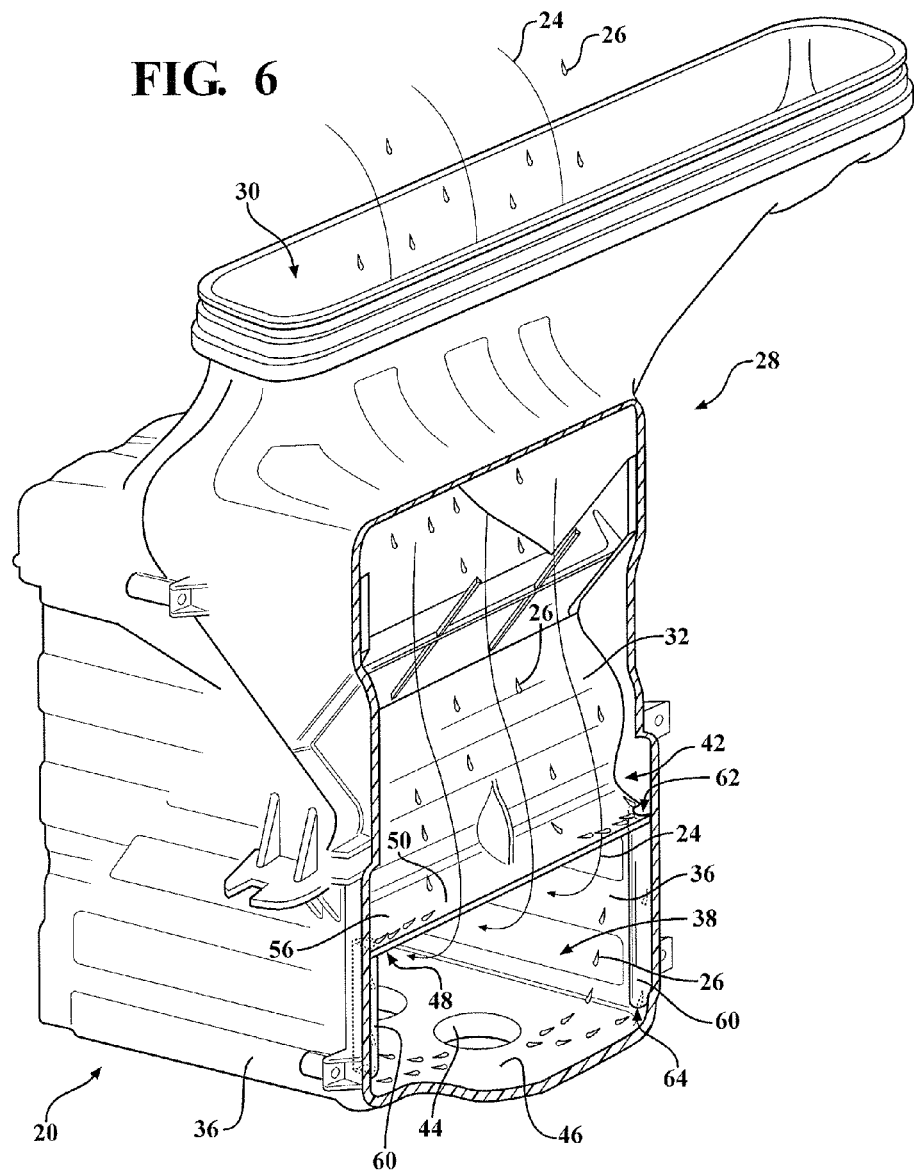
FIG. 6 is another perspective view of a portion of the water separator with the adjacent wall removed to show downspouts in communication with the gutter.

With reference to FIG. 6, the housing 28 may define at least one downspout 60 in communication with the drainage channel 50 for providing the water droplets 26 collected by the drainage channel 50 with a drainage path to an exterior of the water separator 20 outside of the air passage 38. Alternatively, the downspout 60 may be in communication with the drain hole 44 in the base 46 of the housing 28 for allowing the water droplets 26 collected by the gutter 48 to exit the water separator 20. More specifically, the downspout 60 may be defined by the sidewalls 36 of the housing 28. Typically, the downspout 60 is enclosed to isolate the downspout 60 from the air passage 38. More typically, the downspout 60 is completely enclosed such that the downspout 60 is completely isolated from the air passage 38. Moreover, the downspout 60 may be open on one side to allow feasible tooling. Said differently, the downspout 60 may have an inlet 62 and an outlet 64 in communication with a hollow interior of the downspout 60, similar to tubing. Typically, the hollow interior of the downspout 60 spans a length of the downspout 60.

With reference to FIG. 5, as set forth above, the at least one rib 54 directs the water droplets 26 that form on the diverter wall 32 toward the drainage channel 50 of the gutter 48. Nevertheless, the rib 54 is not required for the gutter 48 to direct the water droplets 26. When employed, the rib 54 may direct the water droplets 26 that form on the diverter wall 32 toward the sidewalls 36 of the housing 28 rather than directing the water droplets 26 toward the drainage channel 50 such that the water droplets 26 on the diverter wall 32 are directed away from the terminal end 42 of the diverter wall 32. It is to be appreciated that the rib 54 may be used in combination with or independent from the gutter 48 described above. Generally, the rib 54 is sloped for allowing the water droplets 26 directed by the rib 54 to flow by gravity toward the sidewalls 36 of the housing 28. For example, the rib 54 may be sloped relative to the terminal end 42 of the diverter wall 32. When more than one rib 54 is included, the ribs 54 may intersect and/or be at an angle relative to one another for directing the water droplets 26 that form on the diverter wall 32. For example, the ribs 54 may have a V-shaped or chevron configuration on the diverter wall 32. Alternatively, the ribs 54 may form rows on the diverter wall 32 with the ribs 54 being parallel with one another.

The rib 54 is configured to limit its influence on the air stream 24 flowing through the air passage 38. Said differently, the rib 54 is configured to prevent turbulence within the air stream 24 flowing across the rib 54 within the air passage 38. The ribs 54 may be integral with the diverter wall 32 or, alternatively, the rib 54 may be a discrete component of relative to the diverter wall 32.

The housing 28 defines an air outlet 68. The air outlet 68 is in communication with the air passage 38 downstream from the terminal end 42 of the diverter wall 32 for discharging the air stream 24 that has the reduced water content from the air passage 38. Said differently, the air stream 24 having the second water content is discharged from the water separator 20 via the air outlet 68. Typically, the air stream 24 discharged from the air passage 38 of the water separator 20 is then use in the HVAC unit 22. For example, the air stream 24 discharged from the air passage 38 is received by a blower of the HVAC unit 22 to distribute the air stream 24 to the HVAC unit 22 and, more specifically, the air conditioning system. By delivering the air stream 24 having the reduced water content to the blower, the risk of electrical failures, the risk of odors, and the risk of water entering into the passenger compartment of the vehicle are reduced. Additionally, an air temperature can be more effectively controlled and or regulated to increase comfort in a final distribution areas for the air stream 24, such as the passenger compartment of the vehicle. However, it is to be appreciated that the air stream 24 discharged by the air outlet 68 of the water separator 20 may be used in other application besides the HVAC unit 22.

Figure 7:
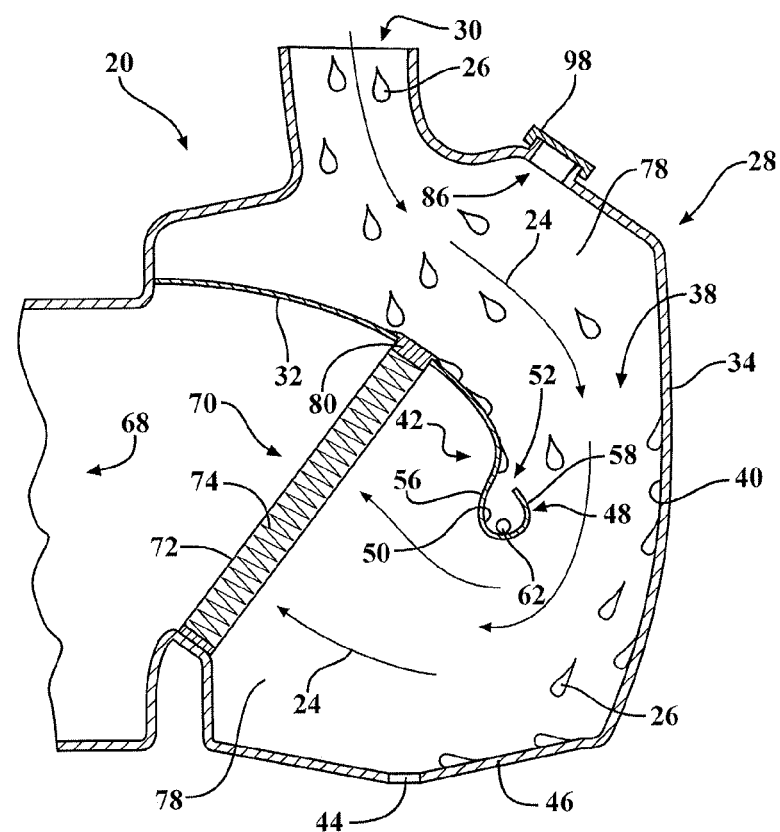
FIG. 7 is another partial cross-sectional view of the water separator showing a filter through the diverter wall.

With reference to FIG. 7, the water separator 20 may include a filter assembly 70 disposed within the air passage 38. The filter assembly 70 is generally located within the air passage 38 downstream of the terminal end 42 of the diverter wall 32 for filtering the air stream 24 having the second water content. Typically, the filter assembly 70 includes a support tray 72 and a filter 74 disposed in the support tray 72. Generally, the support tray 72 and the filter 74 each have a rectangular configuration in cross-section. However, it is to be appreciated that the cross-section of the support tray 72 and the filter 74 can have any suitable configuration.

The filter 74 removed particles 78 from the air stream 24 to prevent the particles 78 from reaching the HVAC unit 22 and, ultimately, the passenger compartment of the vehicle. The filter assembly 70 is typically disposed through a receiving slot 80 defined by the diverter wall 32. The filter assembly 70 is removable from the housing 30 through a pass-through slot 86 defined by the adjacent wall 36. The pass-through slot may include a slot cover 98 for preventing the air stream 24 from passing though the pass-though slot 86. The specific features and characteristics of the filter assembly 70 are set forth in copending U.S. patent application Ser. No. 13/336,619, and the disclosure of which is incorporated by reference.

A method of reducing the water content of the air stream 24 used in the HVAC unit 22 of the vehicle with the water separator 20 is disclosed below. Specifically, the method includes the step of introducing the air stream 24 into the air passage 38 through the air intake 30 defined by the housing 28. The air stream 24 flows through the air passage 38 thereby reducing the water content of the air stream 24 by forming the water droplets 26 on the diverter wall 32. The air stream 24 may flow around the gutter 48 extending from the terminal end 42 of the diverter wall 32 to rapidly change a direction of the air stream 24 thereby removing moisture from the airstream in the form of the water droplets such that moisture removal is maximized and turbulence and pressure drops are minimized.

The water droplets 26 that form on the diverter wall 32 are collected within the drainage channel 50 defined by the gutter 48. The water droplets 26 collected by the drainage channel 50 are then channeled via the drainage channel 50 toward the housing 28 outside the air stream 24 to prevent the water droplets 26 from reentering the air stream 24. When the downspouts 60 are present, the method includes the step of directing the water droplets 26 channeled by the drainage channel 50 to the downspout 60 to provide the water droplets 26 with the drainage path to the exterior of the water separator 20 outside of the air passage 38.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A water separator for reducing a water content of an air stream used in a Heating, Ventilating, and/or Air-conditioning (HVAC) unit of a vehicle, said water separator comprising:
   an air intake for introducing the air stream into said water separator;
   a housing defining said air intake and having a diverter wall and an adjacent wall spaced from said diverter wall with said diverter wall and said adjacent wall defining an air passage within said housing and is in communication with said air intake for allowing the air stream to flow through said housing with said diverter wall having a terminal end extending into said air passage for changing a direction of the air stream flowing through said air passage thereby separating water droplets from the air stream such that the water droplets form on at least said diverter wall to reduce the water content of the air stream;
   an air outlet defined by said housing and in communication with said air passage downstream from said terminal end of said diverter wall for discharging the air stream having the reduced water content from said air passage for use in the HVAC unit; and
   a gutter coupled to said terminal end of said diverter wall in said air passage with said gutter defining a drainage channel configured to receive the water droplets that form on said diverter wall for preventing the water droplets that form on said diverter wall from reentering the air stream flowing through said air stream passage.

2. A water separator as set forth in claim 1 wherein said gutter defining said drainage channel has a J-shaped cross-sectional configuration defining said drainage channel.

3. A water separator as set forth in claim 2 wherein said gutter has a proximal portion coupled to said terminal end of said diverter wall and a terminal finger extending from said proximal portion such that said terminal finger wraps back upon itself to form a hook configuration.

4. A water separator as set forth in claim 2 wherein said housing defines at least one downspout in communication with said drainage channel for providing the water droplets collected by said drainage channel with a drainage path to an exterior of said water separator outside of said air passage.

5. A water separator as set forth in claim 4 wherein said downspout is partially or completely enclosed such that the downspout is isolated from said air passage.

6. A water separator as set forth in claim 1 wherein said housing further comprises a drain hole for providing an outlet to the water droplets separated from the air stream with said drainage channel of said gutter in communication with said drain hole.

7. A water separator as set forth in claim 1 wherein said drainage channel of said gutter has a slope for allowing the water droplets collected by said drainage channel to flow toward said housing within said drainage channel with the aid of gravity.

8. A water separator as set forth in claim 1 wherein said diverter wall comprises at least one rib for directing the water droplets that form on said diverter wall away from said gutter and toward said housing to prevent the water droplets from reentering the air stream.

9. A water separator as set forth in claim 8 wherein said rib has a slope relative to said terminal end for allowing the water droplets collected by said rib to flow toward said housing along said rib with the aid of gravity.

10. A water separator as set forth in claim 1 wherein said gutter defines a slot adjacent said terminal end of said diverter wall with said slot spanning a length of said gutter for allowing the water droplets to enter said drainage channel.

11. A water separator as set forth in claim 1 further comprising a filter assembly that includes a tray and a filter disposed in said tray with said filter assembly disposed in said air passage downstream of said gutter for filtering the air stream.

12. A method of reducing a water content of an air stream used in an HVAC unit of a vehicle with a water separator, which comprises a housing having a diverter wall and an adjacent wall both defining an air passage with the diverter wall having a terminal end extending into said air passage to present the air passage with a general U-shaped configuration and a gutter coupled to the terminal end of the diverter wall, said method comprising the steps of:

introducing the air stream into the air passage through an air intake defined by the housing;

flowing the air stream through the air passage and around the gutter extending from the terminal end of the diverter wall thereby forming water droplets on the diverter wall to reduce the water content of the air stream;

collecting water droplets that form on the diverter wall as the air stream flows through the air passage within a drainage channel defined by the gutter; and channeling the water droplets via the drainage channel toward the housing outside the air stream to prevent the water droplets from reentering the air stream.

13. A method as set forth in claim 12 wherein said housing defines at least one downspout and said method further comprises the step of directing the water droplets channeled by the drainage channel to the downspout to provide the water droplets with a drainage path to an exterior of the water separator outside of the air passage.

14. A method as set forth in claim 12 further comprising the step of flowing the air stream around the gutter extending from the terminal end of the diverter wall to rapidly change a direction of the airstream thereby removing moisture from the airstream in the form of the water droplets such that moisture removal is maximized and turbulence and pressure drops are minimized.

\* \* \* \* \*